United States Patent
Bronstert et al.

(10) Patent No.: US 6,416,905 B1
(45) Date of Patent: Jul. 9, 2002

(54) MIXTURES SUITABLE AS SOLID ELECTROLYTES OR SEPARATORS FOR ELECTROCHEMICAL CELLS

(75) Inventors: Bernd Bronstert, Otterstadt; Helmut Möhwald, Annweiler, both of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/155,131

(22) PCT Filed: Mar. 27, 1997

(86) PCT No.: PCT/EP97/01594

§ 371 (c)(1),
(2), (4) Date: Sep. 23, 1998

(87) PCT Pub. No.: WO97/37397

PCT Pub. Date: Oct. 9, 1997

(30) Foreign Application Priority Data

Mar. 29, 1996 (DE) .......................... 196 12 769

(51) Int. Cl.⁷ ..................... H01M 2/16; H01M 4/60
(52) U.S. Cl. ................. 429/304; 429/306; 429/212
(58) Field of Search ................. 429/188, 304, 429/306, 309, 212; 252/62.2

(56) References Cited

U.S. PATENT DOCUMENTS

| | | | | |
|---|---|---|---|---|
| 4,791,144 A | * | 12/1988 | Nagou et al. ................. | 521/90 |
| 5,011,751 A | | 4/1991 | Yoneyama et al. .......... | 429/192 |
| 5,279,910 A | | 1/1994 | Sasaki et al. ................ | 429/213 |
| 5,296,318 A | | 3/1994 | Gozdz et al. ................ | 429/192 |
| 5,360,686 A | | 11/1994 | Peled et al. ................. | 429/191 |
| 5,429,891 A | | 7/1995 | Gozdz et al. ................ | 429/192 |
| 5,622,792 A | | 4/1997 | Brochu et al. .............. | 429/192 |

FOREIGN PATENT DOCUMENTS

| | | |
|---|---|---|
| EP | 356261 A2 | 2/1990 |
| EP | 537930 | 4/1993 |
| EP | 557240 A1 | 8/1993 |
| EP | 559317 | 9/1993 |
| EP | 576686 | 1/1994 |
| EP | 585072 | 3/1994 |
| GB | 2292945 | 3/1996 |
| WO | WO 94/24715 | 10/1994 |

OTHER PUBLICATIONS

Sheibley et al., "Inorganic–Organic Separators", J. Electrochem. Soc. vol. 127, No. 11, pp.2392–2397, Nov. 1980.*
Munichandraiah et al. "Ionic conductivity and lithium electrode stability in Hydrin: $LiBF_4$ elastomer" Journal of Applied Electrochemistry, vol. 24, No. 10, (Oct. 10, 1994) pp. 1066–1072.
Wieczorek et al. "Composite polyether based solid electrolytes" Electrochimica ACTA vol. 40. No. 13–14 (Oct. 1, 1995) pp. 2251–2258.
Ullmann's Enc. of Ind. Chem., 5th Ed., vol. A3, 1985, pp. 343–397. (No month).

* cited by examiner

Primary Examiner—Carol Chaney
(74) Attorney, Agent, or Firm—Keil & Weinkauf

(57) ABSTRACT

A mixture Ia which comprises a composition IIa consisting of a) 1 to 95% by weight of a solid III, preferably a basic solid III, having a primary particle size of 5 nm to 20 microns, and b) 5 to 99% by weight of a polymeric mass IV obtainable by polymerizing
  b1) 5 to 100% by weight, based on the mass IV of a condensation product V of
    α) at least one compound VI which is capable to react with a carboxylic acid or a sulfonic acid or a derivative thereof or a mixture of two or more thereof, and
    β) at least one mole per mole of the compound VI of a carboxylic acid or a sulfonic acid VII which exhibits at least one radically polymerizable functional group, or a derivative thereof or a mixture of two or more thereof
  and
  b2) 0 to 95% by weight, based on the mass IV, of a further compound VIII having an average molecular weight (number average) of at least 5000 and having polyether segments in the main or side chain, wherein the proportion by weight of the composition IIa in the mixture Ia is 1 to 100% by weight.

17 Claims, No Drawings

MIXTURES SUITABLE AS SOLID ELECTROLYTES OR SEPARATORS FOR ELECTROCHEMICAL CELLS

The present invention relates to mixtures which are e.g. suitable for solid electrolytes or separators for electrochemical cells containing lithium-containing electrolytes, their use for example in solid electrolytes, separators and electrodes; solid electrolytes, separators, electrodes, sensors, electrochromic windows, displays, capacitors and ion-conducting films which respectively comprise such a mixture; electrochemical cells containing such solid electrolytes, separators and/or electrodes; and the use of the solids being comprised in the mixtures in electrochemical cells for improving the cycle stability.

Electrochemical cells, especially rechargeable cells, are generally known, for example from "Ullmann's Encyclopedia of Industrial Chemistry", 5th edition, volume A3, VCH Verlagsgesellchaft mbH, Weinheim, 1985, pages 343–397.

Among these cells, the lithium and lithium ion batteries are particularly important, especially as secondary cells, owing to their high specific energy storage density.

As is described among others in the above citation taken from "Ullmann", the cathode of such cells includes lithiated mixed oxides containing manganese, cobalt, vanadium or nickel, such as those which, in the stoichiometrically simplest case, may be described as $LiMn_2O_4$, $LiCoO_2$, $LiV_2O_5$ or $LiNiO_2$.

These mixed oxides undergo a reversible reaction with compounds capable of incorporating the lithium ions into their lattice, such as graphite, with removal of the small lithium ions from the crystal lattice; in the course of this procedure the metal ions, such as manganese, cobalt or nickel ions, are oxidized. This reaction can be utilized for current storage in an electrochemical cell by separating the compound which receives the lithium ions, i.e. the anode material, and the lithium-containing mixed oxide, i.e. the cathode material by an electrolyte, through which the lithium ions migrate from the mixed oxide to the anode material.

In this arrangement, the compounds suitable for reversible storage of lithium ions are usually fixed to discharge electrodes using a binder.

When the cell is charged, electrons flow through an external voltage source and lithium cations through the electrolyte to the anode material. When the cell is used, the lithium cations flow through the electrolyte while the electrons flow through a useful resistance from the anode material to the cathode material.

In order to avoid a short circuit within the electrochemical cell, there is a layer located between the two electrodes which is electrically insulating but is conductive for the lithium cations. This layer may be a solid electrolyte or a customary separator.

Solid electrolytes and separators consist, as is known, of a carrier material into which there are incorporated a dissociatable compound containing lithium cations, whose purpose is to increase the lithium ion conductivity, and, customarily, further additives such as solvents.

Carrier materials proposed to date include highly resistant polymers (U.S. Pat. No. 5,296,318, U.S. Pat. No. 5,429,891), for example a copolymer of vinylidene difluoride and hexafluoropropene. The use of these high performance (co)polymers has several disadvantages.

Such polymers are not only expensive but are also difficult to dissolve. Furthermore, they increase the resistance of the cell, owing to their comparably low lithium cation conductivity, so that the electrolyte, which usually consists of a compound containing lithium cations, such as $LiPF_6$, $LiAsF_6$ or $LiSbF_6$, and an organic solvent, such as ethylene carbonate or propylene carbonate, has to be added as early as during the preparation of the insulating layer (U.S. Pat. No. 5,296,318, U.S. Pat. No. 5,429,891). Moreover, such polymers are only processible by adding high quantities of plasticizers, for example di-n-butyl phthalate, and of pyrogenic silicic acids in order, on the one hand, to ensure adequate film formation and cohesion of the electrolyte layer, and the capacity for bonding with the electrode layers, and, on the other hand, to ensure an adequate conductivity and permeability for lithium cations. It is subsequently necessary to remove the plasticizer quantitatively from the composite consisting of anode, solid electrolyte layer or separator layer and cathode layer, which is, on the industrial scale, an extremely difficult and expensive extraction step and must be carried out before the batteries are operated. Even if only small traces of the plasticizer remain in the composite, it is not possible to achieve adequate cycle stability in the battery.

Furthermore, known are solid electrolytes on the basis of polyalkylene oxides which are e.g. described in EP-A 559 317, EP-A 576 686, EP-A 537 930, EP-A 585 072 and U.S. Pat. No. 5,279,910. The polyether, as described therein, are modified at their end or functional groups, respectively, e.g. by means of (meth)acryloyl groups and are cross-linked by energy (heat, light) prior to use. Furthermore they generally comprise a conducting salt, e.g. $LiPF_6$, for improving their conductivity. The use of a solid for improving the mechanical, thermal and electrical strength of the solid electrolyte is not described therein. Conclusively, the systems as described therein, although cross-linked, do not always exhibit satisfactory characteristics with respect to the mechanical strength, the porosity of the obtained films and the short circuit resistance.

Accordingly, it is an object of the present invention to remedy these disadvantages and to provide a mixture being especially suitable for the preparation of solid electrolytes and separators, but which may be also used for preparing electrodes in electrochemical cells and for other application as is described hereinafter.

Due to especially the presence of a solid III, as described later herein, the use of the mixture according to the invention results in solid electrolytes, separators or electrodes which exhibit an improved short circuit resistance, an increased pressure resistance, especially at elevated temperatures of above 120° C. and a larger porosity, compared to already known systems, and which are furthermore capable to suppress the formation of lithium dendrites. In addition thereto, the presence of the solid yields an improved cycle strength and an increased ampacity in an electrochemical cell. When using the preferably used basic solids, a neutralization or capture of the acid formed during the operation of an electrochemical cell takes place.

Thus, in one embodiment thereof, the present invention relates to a mixture Ia which comprises a composition IIa consisting of
  a) 1 to 95% by weight of a solid III, preferably a basic solid III, having a primary particle size of 5 nm to 20 microns, and
  b) 5 to 99% by weight of a polymeric mass IV obtainable by polymerizing
    b1) 5 to 100% by weight, based on the mass IV of a condensation product V of
      α) at least one compound VI which is capable to react with a carboxylic acid or a sulfonic acid or a derivative thereof or a mixture of two or more thereof, and β) at least one mole per mole of the compound VI of a carboxylic acid or a sulfonic acid VII which exhibits at least one radically polymerizable functional group, or a derivative thereof or a mixture of two or more thereof and b2) 0 to 95% by weight, based on the mass IV, of a further compound VIII having an average molecular weight (number average) of at least 5000 and having polyether segments in the main or side chain, wherein the proportion by weight of the composition IIa in the mixture Ia is 1 to 100% by weight.

Preferably, the above mixture Ia is a mixture comprising a composition IIa consisting of a) 1 to 95% by weight of a solid III, preferably a basic solid III, having a primary particle size of 5 nm to 20 microns and b) 5 to 99% by weight of a polymeric mass IV obtainable by polymerizing b1) 5 to 100% by weight, based on the mass IV, of a condensation product V consisting of α) a polyhydric alcohol VI whose main chain contains carbon and oxygen atoms, and β) at least one mole per mole of the polyhydric alcohol VI of an alpha, beta unsaturated carboxylic acid VII, and b2) 0 to 95% by weight, based on the mass IV, of a further compound VIII having an average molecular weight (number average) of at least 5000 and having polyether segments in the main or side chain, wherein the proportion by weight of the composition IIa in the mixture Ia is 1 to 100% by weight.

In a further embodiment, the present invention relates to a mixture Ib which comprises a composition IIb consisting of a) 1 to 95% by weight of a solid III, preferably a basic solid III, having a primary particle size of 5 nm to 20 microns, and b) 5 to 99% by weight of a polymer IX obtainable by polymerizing b1) 5 to 75% by weight, based on the polymer IX of a compound X being capable for being radically polymerized, which is different from the carboxylic acid or the sulfonic acid VII or the derivative thereof; or a mixture of two or more thereof, and b2) 25 to 95% by weight, based on the polymer IX, of a further compound VIII having an average molecular weight (number average) of at least 5000 and having polyether segments in the main or side chain, wherein the proportion by weight of the composition IIb in the mixture Ib is 1 to 100% by weight.

Suitable solids III are primarily inorganic solids, preferably inorganic basic solids, which are selected from the group consisting of oxides, mixed oxides, silicates, sulfates, carbonates, phosphates, nitrides, amides, imides and carbides of the elements of the I., II., III., or IV. main group or the IV. side group of the periodic table; a polymer being selected from the group consisting of polyethylene, polypropylene, polystyrene, poly(tetrafluoro-ethylene); poly(vinylidenefluoride), polyamides, polyimides, a solid dispersion comprising such a polymer; and a mixture of two or more thereof.

As examples, there are especially to be mentioned:

Oxides, for example silica, alumina, magnesium oxide or titanium oxide, and mixed oxides, for example those with the elements silicon, calcium, aluminum, magnesium and titanium; silicates, for example ladder silicates, silicates with chain structure, layer silicates, and tectosilicates; sulfates, such as alkaline and alkaline earth metal sulfates; carbonates, for example, alkaline and alkaline earth metal carbonates, for example calcium, magnesium or barium carbonate or lithium, potassium or sodium carbonate; phosphates, for example apatites; nitrides; amides; imides; carbides, and polymers, for example, polyethylene, polypropylene, polystyrene, poly(tetrafluoroethylene); poly(vinylidenefluoride); polyamides; polyimides; or other thermoplastics, thermosets or microgels, solid dispersions, especially those which comprise the abovementioned polymers, and also mixtures of two or more of such solids.

Particularly suitable such solids are basic pigments, which are to be understood as being those whose mixture with a liquid aqueous diluent which itself has a pH of no more than 7 has a pH higher than that of this diluent.

It is advantageous for the solids to be very largely insoluble in the liquid used as electrolyte, to be unswellable, and to be electrochemically inert in the battery medium. Particularly suitable pigments are those having a primary particle size of 5 nm–20 microns, preferably 0.01–10 microns and especially 0.1–5 microns, the given particle sizes being determined by electron microscopy. The melting point of solids should preferably be above the customary operating temperature of the electrochemical cell, with melting points of more than 120° C., in particular of more than 150° C. having proven particularly favorable.

The solids may be symmetric with respect to their shape, i.e. they may exhibit a size ratio height: width: length (aspect ratio) of about 1, and may be a sphere, granule, nearly round bodies, but may also exhibit the shape of any polyhedron, for example a cube, tetrahedron, hexahedron, octahedron or a bipyramid, or may be distorted or asymmetric, i.e. may exhibit a size ratio height: width: length (aspect ratio) being different from 1, and may be in the form of for example a needle, asymmetric tetrahedron, asymmetric bipyramid, asymmetric hexa or octahedron, platelet, disks or as a fibrous body. With respect to solids being asymmetric particles, the above mentioned upper limit for the primary particle size relates to the shortest axis, respectively.

As the compound VI which is capable to react with a carboxylic acid or a sulfonic acid VII or a derivative or a mixture of two or more thereof, all compounds fulfilling this criterium may be used.

Preferably, compound VI is selected from the group consisting of a mono- or polyhydric alcohol whose main chain exhibits besides at least two carbon atoms at least one atom being selected from the group consisting of oxygen, phosphorous and nitrogen; a silicon-containing compound; an amine comprising at least one primary amino group; an amine comprising at least one secondary amino group; an amino alcohol; a mono- or polyvalent thiol; a compound having a least one thiol and at least one hydroxyl group; and a mixture of two or more thereof.

Among those, compounds VI which have two or more functional groups being capable of reacting with the carboxylic or sulfonic acid are preferred.

When using compounds VI which comprise amino groups as a functional group, it is preferred to use those having secondary amino groups resulting in that after the condensation/cross-linking either no or only minor amounts of free NH groups are present in the mixture Ia.

As preferred compounds, the following are to be mentioned:

Mono- or polyhydric alcohols whose main chain contains exclusively carbon atoms having 1 to 20, preferably 2 to 20 and especially 2 to 10 alcoholic OH-groups, in particular di-, tri- or tetrahydric alcohols, preferably those having 2 to 20 carbon atoms, such as ethylene glycol, propane-1,2- or -1,3-diol, butane-1,2- or -1,3-diol butene-1,4- or butine-1,4-diol, hexane-1,6-diol, neopentyl glycol, dodecan-1,2-diol, glycerol trimethylolpropane, pentaerythrite or sugar alcohols, hydroquinone, Novolak, bisphenol A, wherein also, as may be deduced from the above definition, monohydric alcohols, such as methanol, ethanol, propanol, n-, sek.- or tert.-butanol, etc. may be used; furthermore also polyhydroxy olefins, preferably those having two hydroxyl end groups, for example alpha, omega-dihydroxybutadiene may be used; polyester polyoles, for example those known from Ullmanns Encyclopedia of Technical Chemistry, 4th edition, volume 19, page 62 to 65, which are e.g. obtainable by reacting dihydric alcohols with polyvalent, preferably divalent polycarboxylic acids;

mono- or polyhydric alcohols whose main chain exhibits besides at least two carbon atoms at least one oxygen atom, preferably polyether alcohols, for example polymerization products of alkylene epoxides, for example isobutylene oxide, propylene oxide, ethylene oxide, 1,2-epoxybutane, 1,2-epoxypentane, 1,2-epoxyhexane, tetrahydrofuran, styrene oxide, also including polyether alcohols being modified at their end groups, such as polyether alcohols modified by $NH_2$-end groups; these alcohols exhibit preferably a molecular weight (number average) of 100 to 5000, more preferably 200 to 1000 and especially 300 to 800; such compounds are known and for example commercially available under the trade names Pluriol® or Pluronic® (BASF AG);

alcohols as defined above, wherein a part or all carbon atoms are substituted by silicon, in particular polysiloxanes or copolymers of an alkylene oxide and siloxane or mixtures of polyether alcohols and polysiloxanes, as for example described in EP-B 581 296 and EP-A 525 728, may be used, the molecular weight of these alcohols is as specified above;

alcohols as defined above, especially polyether alcohols wherein a part or all oxygen atoms are substituted by sulfur atoms, also having a molecular weight as outlined above;

mono- or polyhydric alcohols comprising in the main chain besides at least two carbon atoms at least one phosphorus or at least one nitrogen atom, such as diethanol amine and triethanol amine;

lactones which are derived from compounds of the general formula HO—$(CH_2)_z$—COOH, wherein z is a number from 1 to 20, such as epsilon-caprolactone, beta-propiolactone, gamma-butyrolactone or methyl-epsilon-caprolactone;

a silicon containing compound, such as di- or trichlorosilane, phenyl trichlorosilane, diphenyl dichlorosilane, dimethyl vinyl chlorosilane; silanols, such as trimethyl silanol;

an amine comprising at least one primary and/or secondary amino group, such as butyl amine, 2-ethylhexyl amine, ethylene diamine, hexamethylene diamine, diethylene triamine, tetraethylene pentamine, pentaethylene hexamine, aniline or phenylene diamine;

polyether diamines, such as 4,7-dioxydecane-1, 10diamine or 4,11-dioxytetradecane- 1,14-diamine;

a mono- or polyvalent thiol, such as aliphatic thiols, such as methane thiol, ethane thiol, cyclohexane thiol, dodecane thiol; aromatic thiols, such as thiophenol, 4-chlorothiophenol, 2-mercaptoaniline;

a compound comprising at least one thiol and at least one hydroxy group, such as 4-hydroxythiophenol, and monothioderivatives of the above defined polyhydric alcohols;

amino alcohols, such as 2-aminoethanol, N-methyl-2-aminoethanol, N-ethyl-2-aminoethanol, N-butyl-2-aminoethanol, 2-amino- 1-propanol, 2-amino-1-phenolethanol, mono- or polyamino polyols having more than two aliphatic bonded hydroxyl groups, such as tris(hydroxymethyl)methylamine, glucamine or N, N'-bis(2-hydroxyethyl)-ethylenediamine.

Mixtures of two or more of the above defined compounds VI may be also used.

According to the invention, the above mentioned compounds VI are condensated with a carboxylic acid or a sulfonic acid VII which exhibits at least one radically polymerizable functional group, or a derivative thereof or a mixture of two or more thereof, thereby at least one, preferably all free groups which are capable for condensation within the compounds VI are condensated with compound VII.

Within the present invention, generally all carboxylic acids and sulfonic acids which exhibit at least one radically polymerizable functional group, or derivatives thereof may be used as the carboxylic acid or sulfonic acid VII. The term "derivatives" encompasses compounds which are derived from a carboxylic or sulfonic acid being modified at their acid function, such as esters, acid halides or acid anhydrides, and compounds being derived from a carboxylic or sulfonic acid, which are modified at the carbon skeleton of the carboxylic or sulfonic acid, such as halogenated carboxylic or sulfonic acids.

As compound VII the following are to be mentioned especially:

alpha,beta-unsaturated carboxylic acids or beta, gamma-unsaturated carboxylic acids.

Particularly suitable alpha, beta-unsaturated carboxylic acids ore those of the formula

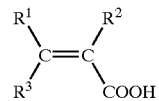

wherein $R^1$, $R^2$ and $R^3$ are hydrogen or $C_1$–$C_4$-alkyl, with acrylic and methacrylic acid being preferred; further suitable compounds are cinnamic acid, maleic acid, fumaric acid, itaconic acid or p-vinylbenzoic acid, and derivatives thereof, such as anhydrides, for example maleic or itaconic anhydride;

halides, especially chlorides, such as acrylic or methacrylic chloride;

esters, for example (cyclo)alkyle (meth)acrylates having up to 20 C-atoms in the alkyl group, such as methyl, ethyl, propyl, butyl, hexyl, 2-ethylhexyl, stearyl, lauryl, cyclohexyl, benzyl, trifluoromethyl, hexafluoropropyl, tetrafluoropropyl (meth)acrylate, polypropyleneglycol mono(meth)acrylates, polyethyleneglycol mono(meth)

acrylates, poly(meth)acrylates of polyhydric alcohols, such as glycerol di(meth)acrylate, trimethylolpropane di(meth)acrylate, pentaerythritol-di(meth)acrylate or pentaerythritoltri(meth)acrylate, diethyleneglycolbis (mono-(2-acryloxy)ethyl)carbonate, poly(meth) acrylates of alcohols which exhibit a radically polymerizable group, such as esters of (meth)acrylic acid and vinyl and/or allyl alcohol;

vinyl esters of other aliphatic or aromatic carboxylic acids, such as vinyl acetate, vinyl propionate, vinyl butyrate, vinyl hexanoate, vinyl octanoate, vinyl decanoate, vinyl stearate, vinyl palmitate, vinyl crotonoate, divinyl adipate, divinyl sebacate, 2-vinyl-2-ethylhexanoate, vinyltrifluoroacetate;

Allyl esters of other aliphatic or aromatic carboxylic acids, such as allyl acetate, allyl propionate, allyl butyrate, allyl hexanoate, allyl octanoate, allyl decanoate, allyl stearate, allyl palmitate, allyl crotonoate, allyl salicylate, allyl lactate, diallyl oxalate, diallyl malonate, diallyl succinate, diallyl glutarate, diallyl adipate, diallyl pimelate, diallyl cinnatricarboxylate, allyltrifluoroacetate, allylperfluorobutyrate, allylperfluorooctanoate;

beta, gamma-unsaturated carboxylic acids or derivatives thereof, such as vinylacetic acid, 2-methylvinyl acetic acid, isobutyl-3-butenoate, allyl-3-butenoate, allyl-2-hydroxy-3-butenoate, diketen.

Sulfonic acids, such as vinyl sulfonic acid, allyl and methallylsulfonic acid, and esters and halides thereof, vinyl benzoesulfonate, 4-vinyl benzoesulfone amide.

Mixtures of two of more of the above described carboxylic and/or sulfonic acids may be also used.

As compounds X being capable for being radically polymerized for the preparation of polymer IX, the following are to be mentioned:

olefinic hydrocarbons, such as ethylene, propylene, butylene, isobutene, hexene and higher homologues, and vinyl cyclohexane;

(meth)acrylonitrile;

halogen containing olefinic compounds, such as vinylidene fluoride, vinylidene chloride, vinylfluoride, vinylchloride, hexafluoropropene, trifluoropropene, 1,2-dichloroethylene, 1,2-difluoroethylene and tetrafluoroethylene;

vinyl alcohol, vinyl acetate, N-vinylpyrrolidone, N-vinylimidazole, vinyl formamide;

phosphorus nitride chlorides, such as phosphorus dichloride nitride, hexachloro(tri phosphazene), and their derivatives which are partly or completely substituted by alkoxy, phenoxy, amino and fluoralkoxy residues, i.e. compounds which may be polymerized to poly (phosphazenes);

aromatic olefinic compounds, such as styrene, alpha-methylstyrene;

vinylether, such as methyl, ethyl, propyl, isopropyl, butyl, isobutyl, hexyl, octyl, decyl, dodecyl, 2-ethylhexyl, cyclohexyl, benzyl, trifluoromethyl, hexafluoropropyl, tetrafluoropropyl vinyl ether.

Mixtures of the above mentioned compounds X may be also used, resulting in copolymers which, depending on the kind of preparation, exhibit a statistical distribution of monomers or yield block copolymers.

These compounds X as well as the condensation products V are polymerized by a common process known to the person skilled in the art, preferably radical polymerisation.

With respect to the obtained molecular weight it is referred to the discussion of compound VIII, as discussed hereinafter.

As the compound VIII particularly suitable are compounds having an average molecular weight (number average) of at least 5.000, preferably 5.000 to 20.000.000, especially 100.000 to 6.000.000, which are capable of solvating lithium cations and to act as a binder. Suitable compounds VIII are for example polyethers and copolymers, which comprise at least 30% by weight, based on the total weight of the compound VIII, of the following structural unit:

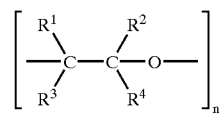

wherein $R^1$, $R^2$, $R^3$ and R4 represent aryl groups, alkyl groups, preferably methyl, or hydrogen, said residues may be the same or different from each other and may contain hetero atoms, such as oxygen, sulfur or silicon. Such compounds are for example described in: M. B. Armand et al., Fast Ion Transport in Solids, Elsevier, N.Y., 1979, S. 131–136 or in FR-A-7832976.

Compound VIII may also consist of mixtures of two or more of these compounds.

The above defined polymeric mass IV and the polymer IX, respectively, may also be present in the form of foams, wherein the solid III is distributed therein.

In accordance with the invention, the compositions IIa should consist of from 1 to 95%by weight, preferably 25 to 90% by weight and especially 30 to 70% by weight, of a solid III and 5 to 99% by weight, preferably 10 to 75% by weight, and especially 30 to 70% by weight of a polymeric mass IV, wherein compound VIII of the polymeric mass IV being intended advantageously to have an average molecular weight (number average) of from 5.000 to 100.000.000, preferably 50.000 to 8.000.000. The polymeric mass IV may be obtained by reacting 5 to 100% by weight, preferably 30 to 70% by weight, based on the polymeric mass IV, of a compound V and 0 to 95% by weight, especially 30 to 70% by weight, based on the polymeric mass IV, of a compound VIII.

In accordance with the invention, the compositions IIb should consist of 1 to 95% by weight, preferably 25 to 90% by weight and especially 30 to 70% by weight of a solid III and from 5 to 99% by weight, preferably 10 to 75% by weight and especially 30 to 70% by weight of a polymer IX, wherein the compound VIII of the polymer IX should preferably have an average molecular weight (number average) of 5.000 to 100.000.000, preferably 50.000 to 8.000.000.

The polymer IX may be obtained by reacting 5 to 75% by weight, preferably 30 to 70% by weight, based on the polymer IX, of a compound X and 25 to 95% by weight, especially 30 to 70% by weight based on the polymer IX, of a compound VIII.

In the following, the mixtures Ia and Ib as well as the compositions IIa and IIb according to the invention are discussed hereinafter together and are denoted as "mixture according to the invention" and "composition according to the invention", respectively.

In order to obtain the mixture according to the invention, which is intended to comprise a composition II according to the invention in quantities from 1 to 100% by weight, preferably 35 to 100% by weight and especially 30 to 70% by weight, based on the mixture according to the invention, it is possible to prepare a composition consisting of a solid III, a condensation product V, optionally a compound VIII or a composition of a solid III, a compound X and a compound VIII, respectively, and customary additives, such as plasticizers, preferably those containing polyethylene oxide of polypropylene oxide.

As plasticizers, the following may be used:

aprotic solvents, preferably those which solvate Li ions, for example dimethyl carbonate, diethyl carbonate, dipropyl carbonate, diisopropyl carbonate, dibutyl carbonate, ethylene carbonate, propylene carbonate, oligoalkylene oxides, such as dibutyl ether, di-tert.-butyl ether, dipentyl ether, dihexyl ether, diheptyl ether, dioctyl ether, dinonyl ether, didecyl ether, didodecyl ether, ethylene glycol dimethyl ether, ethylene glycol diethyl ether, 1-tert.-butoxy-2-methoxyethane, 1-tert.-butoxy-2-ethoxyethane, 1,2-dimiethoxy propane, 2-methoxyethyl ether, 2-ethoxyethyl ether, diethylene glycol dibutyl ether, dimethyleneglycol-tert.-butylmethyl ether, triethyleneglycol dimethyl ether, tetraethyleneglycol dimethyl ether, gamma-butyrolactone, dimethylformamide, hydrocarbons of the general formula $C_nH_{2n+2}$ wherein 7<n<50, organic phosphorus compounds, especially phosphates and phosphonates such as trimethyl phosphate, triethyl phosphate, tripropyl phosphate, tributyl phosphate, triisobutyl phosphate, tripentyl phosphate, trihexyl phosphate, trioctyl phosphate, tris(2-ethylhexyl) phosphate, tridecyl phosphate, diethyl-n-butyl phosphate, tris(butoxyethyl) phosphate, tris(2-methoxyethyl) phosphate, tris(tetrahydrofuryl) phosphate, tris(1H, 1H,5H-octafluoropentyl) phosphate, tris(1H, 1H-trifluoroethyl) phosphate, tris(2-(diethylamino)ethyl) phosphate, diethylethyl phosphonate, dipropylpropyl phosphonate, dibutylbutyl phosponate, dihexylhexyl phosphonate, dioctyloctyl phosphonate, ethyldimethyl phosphonoacetate, methyldiethyl phosphonoacetate, triethyl phosphonoacetate, dimethyl(2-oxopropyl) phosphonate, diethyl(2-oxopropyl)phosphonate, dipropyl(2-oxopropyl) phosphonate, ethyldiethoxyphosphinyl formiate, trimethylphosphonoacetate, triethylphosphonoacetate, tripropylphosphonoacetate, tributylphosphonoacetate; organic sulfur components such as sulfates, sulfonates, sulfoxides, sulfones and sulfites such as dimethyl sulfite, diethyl sulfite, glycole sulfite, dimethyl sulfone, diethyl sulfone, diethylpropyl sulfone, dibutyl sulfone, tetramethylene sulfone, methyl sulfolane, dimethyl sulfoxide, diethyl sulfoxide, dipropyl sulfoxide, dibutyl sulfoxide, tetramethylene sulfoxide, ethylmethane sulfonate, 1,4-butandiolbis(methane sulfonate), diethyl sulfate, dipropyl sulfate, dibutyl sulfate, dihexyl sulfate, dioctyl sulfate, $SO_2ClF$;

nitriles, such as acrylonitrile;

dispersants, especially those with a surfactant structure; and mixtures thereof.

The mixtures according to the invention may be dissolved and dispersed in an inorganic, but preferably organic liquid diluant, the mixture according to the invention being intended to have a viscosity of preferably 100 to 50.000 mPas, and then applying this solution or dispersion in a manner known per se, such as by spraying, pouring, dipping, spin coating, roller coating or printing—by relief, intaglio, planographic or screen printing—to a carrier material. Subsequent processing can be by customary methods, for, example by removing the diluent and curing the binder.

Suitable organic diluents are aliphatic ethers, especially tetrahydrofuran and dioxane, hydrocarbons, especially hydrocarbon mixtures such as petroleum spirit, toluene and xylene, aliphatic esters, especially ethyl acetate and butyl acetate, and ketones, especially acetone, ethyl methyl ketone and cyclohexanone. Mixtures of such diluents can also be employed.

Suitable carrier materials are those materials customarily used for electrodes, preferably metals such as aluminum and copper. It is also possible to use temporary supports, such as films, especially polyester films such as polyethylene terephthalate films. Such films may advantageously be provided with a release layer, preferably comprising polysiloxanes.

The preparation of the solid electrolytes and separators can also be carried out by thermoplastic methods, for example by injection molding, casting, compression molding, kneading or extrusion, with or without a subsequent calendering step of the described mixture according to the invention.

After forming a film of the mixture I, volatile components such as solvent or plasticizer can be removed.

The mixture according to the invention can be crosslinked in a manner known per se, for example by irradiation with ionic or ionizing radiation, electron beams, preferably at an acceleration voltage of 20–2000 kV and a radiation dose of 5–50 Mrad, or with UV or visible light, in which case, as is customary, an initiator such as benzil dimethyl ketal or 1,3,5-trimethyl-benzoyltriphenylphosphine oxide, is advantageously added in quantities of, in particular, not more than 1% by weight, based on the polymeric composition IV or the polymer IX, respectively, and crosslinking can be accomplished over the course of in general from 0.5 to 15 minutes, advantageously under inert gas such as nitrogen or argon, by means of thermal free-radical polymerization, preferably at more than 60° C., advantageously adding an initiator such as azobisisobutyronitrile in quantities of, in general, not more than 5% by weight, preferably from 0.05 to 1% by weight, based on the polymeric composition IV or the polymer IX, respectively, by means of electrochemically induced polymerization, or by means of ionic polymerization, for example by acid-catalyzed cationic polymerization, in which case primarily suitable acid catalysts are preferably Lewis acids such as $BF_3$, or in particular LiBF4 or $LiPF_6$. In this case, catalysts which contain lithium ions, such as $LiBF_4$ or $LiPF_6$, may advantageously remain in the solid electrolyte or separator as conductive salt.

In case the mixture according to the invention should be used as a solid electrolyte or a cathode in an electrochemical cell, a dissociable, lithium cations containing compound, a so-called conducting salt, and optionally further additives, such as especially organic solvents, a so-called electrolyte, should be incorporated.

These compounds may be admixed partly or completely during the preparation of the layer of the mixture, or may be incorporated into the layer after the preparation thereof.

As conducting salts, the commonly known conducting salts which are described e.g. in EP-A 96 629, may be used. Particularly suitable are compounds, such as $LiPF_6$, $LiAsF_6$, $LiSbF_6$, $LiClO_4$, $LiN(CF_3SO_2)_2$, $LiBF_4$ or $LiCF_3SO_3$ and mixtures thereof. These conducting salts are used in amounts of 0.1 to 20% by weight, preferably 1 to 10% by weight, respectively based on the composition according to the invention.

As organic electrolytes, the compounds as discussed above under "plasticizers" may be used, preferably the commonly used organic to electrolytes, preferably esters such as ethylene carbonate, propylene carbonate, dimethyl carbonate and diethyl carbonate or mixtures thereof may be used.

Solid electrolytes according to the invention suitable for electrochemic cells, separators and/or electrodes should preferably have a thickness of 5 to 500 microns, preferably 10 to 500 microns, more preferable 10 to 200 microns and especially 20 to 100 microns.

In case the mixture according to the invention should be used as a cathode or for preparing a cathode, respectively, an electron conducting electrochemical active compound, as generally used for cathodes (cathode compound), preferably a lithium compound may be incorporated. To be mentioned are in particular:

$LiCoO_2$, $LiNiO_2$, $LixMnO_2$ ($0<x\leq1$), $Li_xMn_2O_4$ ($0<x\leq2$), $Li_xMoO_2$ ($0<x\leq2$), $Li_xMnO_3$ ($0<x\leq1$), $Li_xMnO_2$ ($0<x\leq2$), $Li_xMn_2O_4$ ($0<x\leq2$), $Li_xV_2O_4$ ($0<x\leq2.5$), $Li_xV_2O_3$ ($0<x\leq3.5$), $Li_xVO_2$ ($0<x\leq1$), $Li_xWO_2$ ($0<x\leq1$), $Li_xWO_3$ ($0<x\leq1$), $Li_xTiO_2$ ($0<x\leq1$), $Li_xTi_2O_4$ ($0<x\leq2$), $Li_xRuO_2$ ($0<x\leq1$), $Li_xFe_2O_3$ ($0<x\leq2$), $Li_xFe_3O_4$ ($0<x\leq2$), $Li_xCr_2O_3$ ($0<x\leq3$), $Li_xCr_3O_4$ ($0<x\leq3.8$), $Li_xV_3S_5$ ($0<x\leq1.8$), $Li_xTa_2S_2$ ($0<x\leq1$), $Li_xFeS$ ($0<x\leq1$), $Li_xFeS_2$ ($0<x\leq1$), $Li_xNbS_2$ ($0<x\leq2.4$), $Li_xMoS_2$ ($0<x\leq3$), $Li_xTiS_2$ ($0<x\leq2$), $Li_xZrS_2$ ($0<x\leq2$), $Li_xNbSe_2$ ($0<x\leq3$), $Li_xVSe_2$ ($0<x\leq1$), $Li_xNiPS_2$ ($0<x\leq1.5$), $Li_xFePS_2$ ($0<x\leq1.5$).

When used as an anode, as an anode material a commonly electrone conducting electrochemical active compound known from the prior art (anode compound) is incorporated, the following compounds may be particularly mentioned:

lithium, lithium containing alloys, micronized carbon black, natural and synthetic graphite, syntheticly graphitized carbon dust and carbon fibers, oxides, such as titanium, zink, tin, molybdenum, wolfram oxide, carbonates, such as titanium, molybdenum and zink carbonate.

When used for preparing an anode or as an anode, up to 20% by weight, based on the total weight of the mixture, of a conducting carbon black and optionally the above mentioned commonly used additives are added to the mixture according to the invention. When used for the preparation of a cathode or as a cathode, the mixture contains 0.1 to 20% by weight conducting carbon black, based on the total weight thereof.

Furthermore, the present invention relates to a composite, which may be in particular used in electrochemical cells, preferably in the form of a film, more preferably in the form of a film having a total thickness of 15 to 1.500 microns, especially having a total thickness of 50 to 500 microns, comprising at least one first layer comprising an electron conducting electrochemical active compound, and at least one second layer being free of an electron-conducting electrochemically active compound, the latter layer comprising the mixture according to the invention.

Furthermore, the present invention describes a process for the preparation of such an composite comprising the following steps:

(I) Preparing at least one first layer, as defined above;

(II) Preparing at least one second layer, as defined above; and (III) subsequently combining the at least one first layer and the at least one second layer by a commonly used coating process.

Preferably, the at least one second layer is prepared on a temporary support.

According to the invention, there may be used commonly used temporary supports, such as a separation film of a polymer or a preferably coated paper, such as a siliconized polyester film. The preparation of this second layer may be also conducted on a permanent support, such as a discharge electrode, or without any support.

Combining and preparation, respectively, of the above defined layers may is be achieved by pressureless processes for coating or preparing films, such as pouring or knife coating, as well as by processes under pressure, such as extruding, laminating, coating, calandering or pressing. Optionally the composite as prepared as described above may be cross-linked or cured by radiation, electrochemically or thermally.

It is of course possible that besides the above defined second layer also the above defined first layer may comprise the mixture according to the invention.

As may be deduced from the above, it is also possible to provide a composite with the constituents separation film/separator (second layer)/electrode (first layer).

Furthermore, it is possible by means of double-sided coating to provide a composite with the constituents anode/separator/cathode.

For example, it is proceeded as follows:

First an anode material, e.g. tin oxide, conducting carbon black, the mixture according to the invention, a conducting salt and a plasticizer, e.g. propylene carbonate may be blended and the resulting mixture is poured on a discharge electrode and subsequently radiated by UV light (component 1). Then a cathode material, e.g. $LiMn_2O_4$ is applied on a discharge electrode which is coated by conducting carbon black, and a composition of the mixture according to the invention, a conducting salt and a plasticizer is poured thereonto. Also this composite is subsequently radiated by UV light (component 2). By combining the above described two components a composite is obtained which may be used as an electrochemical cell in combination with a freely chosen solid and/or liquid electrolyte.

A composite of the structure anode/separator/cathode, as described above, may be also prepared without the use of a carrier or the discharge electrode, respectively, since the obtained composite consisting of a first and a second layer, as defined above, as such has a mechanical stability sufficient to be used in electrochemical cells.

Such a composite may be filled with the electrolyte and the conducting salt either before combining the layers or, preferably, after combining the layers, optionally after contacting the same with suitable discharge electrodes, e.g. a metal film, and may be even carried out after introducing the composite in a battery housing, whereby the specific microporous structure of the layers achieved by using the mixture according to the invention, particularly attributed to the presence of the above defined solid in the separator and optionally in the electrodes, allows the soaking of the electrolyte and the conducting salt and the displacement of the air being present in the pores. The filling may be conducted at temperatures ranging from 0° C. to about 100° C., depending on the used electrolyte.

As may be deduced from the above, the present invention also relates to the use of a mixture according to the invention, or a composite, as defined above, for preparing a solid electrolyte, a separator, an electrode, a sensor, an electrochromic window, a display, a capacitor or an ion conducting film.

Furthermore, the present invention relates to a solid electrolyte, separator, electrode, sensor, electrochromic window, display, capacitor, ion conducting film comprising a mixture according to the invention or a composite, as defined above.

Still further, the present invention relates to an electrochemical cell which comprises a solid electrolyte, a separator or an electrode, as defined above, or a combination of two or more thereof, as well as the use of the electrochemical cell according to the invention as a car battery, apparatus battery or flat battery.

Still further, the present invention generally relates to the use of a solid III having a particle size of 5 nm to 20 microns in a solid electrolyte, a separator, or an electrode for increasing the cycle stability of electrochemical cells, since during the course of achieving the present invention it has been found that the addition of such a solid has an extremely positive influence on this characteristic of electrochemical cells.

EXAMPLES

Example 1

75 g of a wollastonite which had been rendered hydrophobic with epoxy silane (Tremin® 800 EST, from Quarzwerke Frechen) with a mean particle size of 3 microns, whose aqueous suspension had a pH of 8.5, was dispersed in 300 g of toluene using a high-speed stirrer. To this mixture were then added 12.5 g of a polyethylene oxide having an average molecular weight (numerical average) of 2,000,000 (Polyox®, from Union Carbide), 12.5 g of a methacrylic acid diester of a propylene oxide-ethylene oxide block polymer (Pluriol® PE600, from BASF AG) and 0.02 g of a UV photoinitiator (Lucirin® BDK, from BASF AG).

Using a doctor knife with a gap of 300 microns, the mixture was then applied to silicone-treated release paper at 60° C., the diluent was removed over the course of 5 minutes, and then removal of the dried coating gave a film with a thickness of about 40 microns which was subjected to photocrosslinking under an argon atmosphere, by exposure for 10 minutes at a distance of 5 cm below an array of superactinic fluorescent tubes (TL 09, from Philips).

The flexible film was of excellent flexural strength. Radii of flexure down to far below 1 mm were tolerated without breaking.

Even after storage for more than two weeks at room temperature, the film showed no spherulitic polyethylene oxide crystals, and had a good swelling resistance in the above mentioned organic electrolytes containing a conductive salt.

The organic electrolytes containing a conductive salt were sufficiently absorbed within a few minutes by spontaneous inward diffusion, with swelling by weight of less than 50%

The swollen film was strong.

The results are compiled in the Table.

Example 2

60 g of wollastonite having a mean particle size of 3 micons, whose aqueous suspension had a pH of 8.5, was dispersed in 200 g of tetrahydrofuran (THF) using a high-speed stirrer. To the mixture there were then added 13.3 g of a polyethylene oxide having an average molecular weight (numerical average) of 2,000,000 (Polyox®, from Union Carbide), 13.3 g of a methacrylic acid diester of a propylene oxide-ethylene oxide block polymer (Pluriol® PE600, from BASF AG), 13.3 g of a THF-soluble vinylidene fluoride-hexafluoropropene copolymer (Kynarflex® 2850, from ELF-Atochem) and 0.02 g of a UV photoinitiator(Lucirin® BDK, from BASF AG).

Using a doctor knife with a gap of 500 microns, the mixture was then applied to silicone-treated release paper at 60° C., the diluent was removed over the course of 5 minutes, and then removal of the dried coating gave a film with a thickness of about 50 microns which was subjected to photocrosslinking under a nitrogen atmosphere, by exposure for 10 minutes at a distance of 5 cm below an array of superactinic fluorescent tubes (TL 09, from Philips).

The flexible film was of excellent flexural strength. Radii of flexure down to far below 1 mm were tolerated without breaking.

Even after storage for more than two weeks at room temperature, the film showed no spherulitic polyethylene oxide crystals, and had a good swelling resistance in the abovementioned organic electrolytes containing a conductive salt.

The organic electrolytes containing a conductive salt were sufficiently absorbed within a few minutes by spontaneous inward diffusion, with swelling by weight of less than 50%.

The swollen film was strong.

The results are compiled in the Table.

Example 3

60 g of quartz flour (Silbond® 800 EST, from Quarzwerke Frechen) having a mean particle size of 3 microns, whose aqueous suspension had a pH of 7.5, was dispersed in 250 g of tetrahydrofuran (THF) using a high-speed stirrer. To the mixture there were then added 13.3 g of a polyethylene oxide having an average molecular weight (numerical average) of 3,000,000 (Polyox®, from Union Carbide), 13.3 g of a methacrylic acid diester of a propylene oxide-ethylene oxide block polymer (Pluriol® PE600, from BASF AG), and 13.3 g of a THF-soluble vinylidene fluoride-hexafluoropropene copolymer (Kynarflex® 2850, from ELF-Atochem).

Using a doctor knife with a gap of 500 microns, the mixture was then applied to silicone-treated release paper at 60° C., the diluent was removed over the course of 5 minutes, and then removal of the dried coating gave a film with a thickness of about 50 microns which was subjected to crosslinking under a nitrogen atmosphere, by irradiation with electrons at an acceleration voltage of 150 kV with a dose of 30 Mrad.

The flexible film was of excellent flexural strength. Radii of flexure down to far below 1 mm were tolerated without breaking.

Even after storage for more than two weeks at room temperature, the film showed no spherulitic polyethylene oxide crystals, and had a good swelling resistance in the abovementioned organic electrolytes containing a conductive salt.

The organic electrolytes containing a conductive salt were sufficiently absorbed within a few minutes by spontaneous inward diffusion, with swelling by weight of less than 50%.

The swollen film was strong.

The results are compiled in the Table.

Example 4

60 g of a wollastonite which had been rendered hydrophobic with methacryloyl silane with a mean particle size of 3 microns, whose aqueous suspension had a pH of 8.5, was dispersed in 200 g of tetrahydrofuran (THF) using a high speed stirrer. To this mixture were then added 13.3 g of a polyethylene oxide having an average molecular weight (numerical average) of 2,000,000 (Polyox®, from Union Carbide), 13.3 g of a methacrylic acid diester of a propylene oxide-ethylene oxide block polymer (Pluriol® PE600, from BASF AG), 13.3 g of a THF-soluble vinylidene fluoride-hexafluoropropene copolymer (Kynarflex® 2850, from Elf-Atochem) and 0.02 g of azobisisobutyronitrile.

Using a doctor knife with a gap of 500 microns, the mixture was then applied to silicone-treated release paper at 60° C., the diluent was removed over the course of 5 minutes, and then removal of the dried coating gave a film with a thickness of about 50 microns which was subjected to photocrosslinking under a nitrogen atmosphere, by exposure for 10 minutes at a distance of 5 cm below an array of superactinic fluorescent tubes (TL 09, from Philips).

The flexible film was of excellent flexural strength. Radii of flexure down to far below 1 mm were tolerated without breaking.

Even after storage for more than two weeks at room temperature, the film showed no spherulitic polyethylene oxide crystals, and had a good swelling resistance in the abovementioned organic electrolytes containing a conductive salt.

The organic electrolytes containing a conductive salt were sufficiently absorbed within a few minutes by spontaneous inward diffusion, with swelling by weight of less than 50%.

The swollen film was strong.

The results are compiled in the Table.

Example 5

Example 5 is mainly indentical with example 1, however, it is different in that
  instead of Tremin® 600 EST, Tremin® 939-600 MST, a wollastonite in the form of needles which had been rendered hydrophobic with methacrylsilane with a mean particle size of 3.5 microns was used,
  instead of Pluriol® PE600 Pluriol® E600, an ethylene oxide polymer, respectively in amounts as stated in example 1 was used; and
  the doctor knife used for coating the obtained composition on a siliconized release paper had a gap of 200 microns.

The results of the obtained film which was treated according to example 1 are shown in the Table.

Comparison Example 1

12.5 g of a polyethylene oxide having an average molecular weight (numerical average) of 2,000,000 (Polyox®, from Union Carbide), 12.5 g of a methacrylic acid diester of a propylene oxide-ethylene oxide block polymer (Pluriol® PE600, from BASF AG) and 0.02 g of a UV photoinitiator (Lucirin® BDK, from BASF AG) were dissolved in 200 g of THF.

Using a doctor knife with a gap of 750 microns, the mixture was then applied to silicone-treated release paper at 60° C., the diluent was removed over the course of 5 minutes, and then removal of the dried coating gave a film with a thickness of about 40 microns which was subjected to photocrosslinking under an argon atmosphere, by exposure for 10 minutes at a distance of 5 cm below an array of superactinic fluorescent tubes (TL 09, from Philips).

The flexible film was of excellent flexural strength. Radii of flexure down to far below 1 mm were tolerated without breaking. Even after storage for more than two weeks at room temperature, the film showed no spherulitic polyethylene oxide crystals, and had a good swelling resistance in the abovementioned organic electrolytes containing a conductive salt.

The organic electrolytes containing a conductive salt were sufficiently absorbed within a few minutes by spontaneous inward diffusion, with swelling by weight of less than 150%, with a considerable change in size and thickness of the film.

The strength was much less than in Examples 1 to 3.

In lithium ion batteries, the film led in all cases to failure of the cells as a result of excessive self-discharging rates or micro-short circuits.

The results are compiled in the Table.

Comparison Example 2

75 g of a wollastonite which had been rendered hydrophobic with epoxy silane (Tremin® 800 EST, from Quarzwerke Frechen) with a mean particle size of 3 microns, whose aqueous suspension had a pH of 8.5, was dispersed in 300 g of toluene using a high-speed stirrer. To this mixture were then added 12.5 g of a polyethylene oxide having an average molecular weight (numerical average) of 2,000,000 (Polyox®, from Union Carbide), 12.5 g of a methacrylic acid diester of a propylene oxide-ethylene oxide block polymer (Pluriol® PE600, from BASF AG) and 0.02 g of a UV photoinitiator (Lucirin® BDK, from BASF AG).

Using a doctor knife with a gap of 300 microns, the mixture was then applied to silicone-treated release paper at 60° C., the diluent was removed over the course of 5 minutes, and then removal of the dried coating gave a film with a thickness of about 40 microns.

The flexible film was of excellent flexural strength. Radii of flexure down to far below 1 mm were tolerated without breaking.

After storage for more than two weeks at room temperature, the film showed small circular spherulitic polyethylene oxide crystals, and did not have good swelling resistance in the abovementioned organic electrolytes containing a conductive salt. After a swelling time of just a few minutes, cracks are formed or the film becomes tacky, with the result that the swollen film can no longer be handled.

The results are compiled in the Table.

Comparison Example 3

In accordance with U.S. Pat. No. 5,429,891, Example 1 (F), the addition was made, to a mixture of 30 g of a vinylidene-hexafluoropropene copolymer (Kynarflex® 2822, from ELF-Atochem), 20 g of a silanized pyrogenic silicic acid (Aerosil R974, from Degussa), whose aqueous suspension has a pH of 7, 50 g of dibutyl phthalate (Palatinol C, from BASF AG) and 200 g of acetone, of 5% by weight, based on dibutyl phthalate, of trimethylolpropane trimethacrylate.

The mixture was then applied to a glass plate using a doctor knife having a gap of 750 microns, dried for 15 minutes in a stream of air, and embedded between 0.075 mm thick Mylar® layers. The 100 microns film layer was subsequently crosslinked by irradiation with electrons with an energy of 4.5 MeV at a dose of 5 Mrad, a dose of 2.5 Mrad being used per irradiation procedure.

The flexible film had a good flexural strength.

Before the film could be used in lithium ion batteries, laborious removal of the plasticizer by extraction from the film was necessary, since otherwise only a deficient cycle strength is achieved, as a result of electrode poisoning. To remove the plasticizer, the film was subjected to five extraction operations, each lasting 10 minutes, with a quantity of 50 times the film weight of diethyl ether, at room temperature. Following removal of the plasticizer, the film is unstable and fractures readily on bending.

The plasticizer-free film showed good swelling resistance in the abovementioned organic electrolytes containing a conductive salt.

The organic electrolytes containing a conductive salt were sufficiently absorbed within a few minutes by spontaneous inward diffusion.

The swollen film was strong.

The results are compiled in the Table.

TABLE

|  | Ex. 1 | Ex. 2 | Ex. 3 | Ex. 4 | Ex. 5 | Comp. Ex. 1 | Comp. Ex. 2 | Comp. Ex. 3 |
|---|---|---|---|---|---|---|---|---|
| STRENGTH WITH PLASTICIZER | — | — | — | — | — | — | — | 2 |
| EXTRACTION | — | — | — | — | — | — | — | needed |
| STRENGTH WITHOUT PLASTICIZER | 2 | 1 | 1 | 1 | 1 | 2 | 5 | 5 |
| SWELLING RESISTANCE | 2 | 2 | 2 | 2 | 2 | 3 | 5 | 2 |
| STRENGTH AFTER SWELLING | 2 | 2 | 2 | 2 | 2 | 4 | 6 | 2 |
| CONDUCTIVITY | 2 | 2 | 2 | 2 | 1 | 2 | 4 | 2 |
| SHORT CIRCUIT RESISTANCE | 1 | 1 | 1 | 1 | 1 | 4 | 6 | 1 |
| ELECTRO-CHEMICAL LOADING CAPACITY | 1 | 2 | 3 | 2 | 1 | 5 | 6 | 4 |
| CYCLE STRENGTH | 1 | 1 | 1 | 1 | 1 | 5 | 6 | 2 | grades:
1 very good
2 good
3 satisfactory
4 defective
5 poor
6 too poor to conduct the test

What is claimed is:

1. A composition IIa consisting essentially of
   a) 1 to 95% by weight of a basic solid III having a primary particle size of 5 nm to 20 microns, and
   b) 5 to 99% by weight of a polymeric mass IV obtained by polymerizing
      b1) 5 to 100% by weight, based on the mass IV of a condensation product V of
         α) at least one compound VI selected from the group consisting of a mono- or polyhydric alcohol whose main chain contains exclusively carbon atoms; a mono- or polyhydric alcohol whose main chain exhibits besides at least two carbon atoms at least one atom being selected from the group consisting of oxygen, phosphorous and nitrogen; a silicon-containing compound; an amine comprising at least one primary amino group; an amine comprising at least one secondary amino group; an amino alcohol; a mono- or polyvalent thiol; a compound having at least one thiol and at least one hydroxyl group; and a mixture of two or more thereof, and
         β) at least one mole per mole of compound VI of a carboxylic acid or a sulfonic acid VII, or a derivative thereof, selected from the group consisting of an alpha,beta-unsaturated carboxylic acid or a derivative thereof, a vinyl ester of an aliphatic or an aromatic carboxylic acid, an allyl ester of an aliphatic or an aromatic carboxylic acid, and a mixture of two or more thereof
         and
      b2) 0 to 95% by weight, based on the mass IV, of a further compound VIII having an average molecular weight (number average) of at least 5000 and having polyether segments in the main or side chain.

2. The composition of claim 1, wherein the composition IIa consists essentially of
   a) 1 to 95% by weight of a solid III having a primary particle size of 5 nm to 20 microns, and
   b) 5 to 99% by weight of a polymeric mass IV obtained by polymerizing
      b1) 5 to 100% by weight, based on the mass IV of a condensation product V consisting of
         α) a polyhydric alcohol VI whose main chain contains carbon and oxygen atoms, and
         β) at least one mole per mole of the polyhydric alcohol VI of an alpha, beta-unsaturated carboxylic acid VII, and
      b2) 0 to 95% by weight, based on the mass IV, of a further compound VIII having an average molecular weight (number average) of at least 5000 and having polyether segments in the main or side chain.

3. The composition of claim 1, wherein the solid III is an inorganic basic compound selected from the group consisting of oxides, mixed oxides, silicates, sulfates, carbonates, phosphates, nitrides, amides, imides and carbides of the elements of the Ia, IIa, IIIa, IVa or IVb group of the periodic table; and a mixture of two or more thereof.

4. Composite which comprises at least one first layer comprising an electron-conducting electrochemically active compound, and at least one second layer being free of an electron-conducting electrochemically active compound, the latter layer comprising a composition according to claim 1.

5. A solid electrolyte, separator or electrode comprising a composite according to claim 4.

6. An electrochemical cell which comprises the solid electrolyte, separator, or electrode of claim 5 or a combination of two or more thereof.

7. Car battery, apparatus battery or flat battery, comprising the electrochemical cell of claim 6.

8. A solid electrolyte, separator or electrode comprising a composition according to claim 1.

9. An electrochemical cell which comprises the solid electrolyte, separator, or electrode of claim 8 or a combination thereof.

10. Car battery, apparatus battery or flat battery, comprising the electrochemical cell of claim 9.

11. A composition IIb consisting essentially of
  a) 1 to 95% by weight of a basic solid III having a primary particle size of 5 nm to 20 microns, and
  b) 5 to 99% by weight of a polymer IX obtained by polymerizing
    b1) 5 to 75% by weight, based on the polymer IX of a compound X being capable of being radically polymerized, and
    b2) 25 to 95% by weight, based on the polymer IX, of a further compound VIII having an average molecular weight (number average) of at least 5000 and having polyether segments in the main or side chain.

12. The composition of claim 11, wherein the solid III is an inorganic basic compound which is selected from the group consisting of oxides, mixed oxides, silicates, sulfates, carbonates, phosphates, nitrides, amides, imides and carbides of the elements of the Ia, IIa, IIIa, IVa or IVb group of the periodic table; and a mixture of two or more thereof.

13. Composite which comprises at least one first layer comprising an electron-conducting electrochemically active compound, and at least one second layer being free of an electron-conducting electrochemically active compound, the latter layer comprising a composition according to claim 11.

14. A solid electrolyte, separator or electrode comprising a composition according to claim 11.

15. An electrochemical cell which comprises the solid electrolyte, separator, or electrode of claim 14 or a combination of two or more thereof.

16. Car battery, apparatus battery or flat battery, comprising the electrochemical cell of claim 15.

17. A composition IIa comprising
  a) 1 to 95% by weight of a basic solid III having a primary particle size of 5 nm to 20 microns, and
  b) 5 to 99% by weight of a polymeric mass IV obtained by polymerizing
    b1) 5 to 100% by weight, based on the mass IV of a condensation product V of
      α) at least one compound VI selected from the group consisting of a mono- or polyhydric alcohol whose main chain contains exclusively carbon atoms; a mono- or polyhydric alcohol whose main chain exhibits besides at least two carbon atoms at least one atom being selected from the group consisting of oxygen, phosphorous and nitrogen; a silicon-containing compound; an amine comprising at least one primary amino group; an amine comprising at least one secondary amino group; an amino alcohol; a mono- or polyvalent thiol; a compound having at least one thiol and at least one hydroxyl group; and a mixture of two or more thereof, and
      β) at least one mole per mole of compound VI of a carboxylic acid or a sulfonic acid VII, or a derivative thereof, selected from the group consisting of an alpha,beta-unsaturated carboxylic acid or a derivative thereof, a vinyl ester of an aliphatic or an aromatic carboxylic acid, an allyl ester of an aliphatic or an aromatic carboxylic acid, and a mixture of two or more thereof and
    b2) 0 to 95% by weight, based on the mass IV, of a further compound VIII having an average molecular weight (number average) of at least 5000 and having polyether segments in the main or side chain.

\* \* \* \* \*